(12) United States Patent
Fein et al.

(10) Patent No.: US 9,114,941 B1
(45) Date of Patent: Aug. 25, 2015

(54) TROLLEY DUMPER APPARATUS

(71) Applicant: Sebright Products, Inc., Hopkins, MI (US)

(72) Inventors: Patrick Fein, Dorr, MI (US); William Dale Brisbin, Hopkins, MI (US); Brent H. Sebright, Hopkins, MI (US); James Scobey, Hopkins, MI (US)

(73) Assignee: Sebright Products, Inc., Hopkins, MI (US)

( * ) Notice: Subject to any disclaimer, the term of this patent is extended or adjusted under 35 U.S.C. 154(b) by 201 days.

(21) Appl. No.: 13/790,787

(22) Filed: Mar. 8, 2013

(51) Int. Cl.
*B65G 67/02* (2006.01)
*B65F 1/12* (2006.01)
*B65G 67/04* (2006.01)
*B65G 65/32* (2006.01)
*B65F 3/02* (2006.01)

(52) U.S. Cl.
CPC ............... *B65G 67/04* (2013.01); *B65F 1/122* (2013.01); *B65G 65/32* (2013.01); *B65F 2003/025* (2013.01)

(58) Field of Classification Search
CPC ............ B65F 1/12; B65F 1/122; B65F 1/125; B65F 2003/025; B65F 2003/0253; B65F 2003/0256
USPC .................................................... 298/12–13
See application file for complete search history.

(56) References Cited

U.S. PATENT DOCUMENTS

| | | | | |
|---|---|---|---|---|
| 3,270,900 | A * | 9/1966 | Sherman | 414/303 |
| 4,470,747 | A * | 9/1984 | Tichenor | 414/491 |
| 4,832,561 | A * | 5/1989 | Nijenhuis | 414/500 |
| 4,896,593 | A * | 1/1990 | Slusser | 100/345 |
| 4,943,118 | A * | 7/1990 | Davis | 298/12 |
| 4,948,324 | A * | 8/1990 | Niederer | 414/415 |
| 5,315,924 | A * | 5/1994 | Kruzick | 100/345 |
| 6,206,477 | B1 * | 3/2001 | Rexus et al. | 298/23 MD |
| 6,213,706 | B1 * | 4/2001 | Christenson | 414/408 |
| 6,371,564 | B1 * | 4/2002 | Yates et al. | 298/1 A |
| 7,699,575 | B2 * | 4/2010 | Frankel | 414/395 |
| 8,087,731 | B1 * | 1/2012 | Rogers | 298/18 |
| 2013/0193742 | A1 * | 8/2013 | Eidsmore | 298/12 |
| 2013/0297518 | A1 * | 11/2013 | Nassar et al. | 705/308 |

* cited by examiner

*Primary Examiner* — Saul Rodriguez
*Assistant Examiner* — Ashley Romano
(74) *Attorney, Agent, or Firm* — McGarry Bair PC

(57) ABSTRACT

An apparatus includes an elevated structure extending along and above a receptacle, a trolley for travel along the elevated structure, a trolley bucket supported by the trolley for receiving and discharging unconsolidated material, and a high-lift structure including a rotatable dumper lift for lifting unconsolidated material from a first elevation to a second elevation greater than the first elevation, and discharging unconsolidated material into the trolley bucket. The high-lift structure is operably coupled with the elevated structure. The rotatable dumper lift can receive a first volume of unconsolidated material at the first elevation, lift the first volume from the first elevation to the second elevation, and discharge the first volume into the trolley bucket. The trolley bucket can discharge the first volume of unconsolidated material into the receptacle while the rotatable dumper lift receives a second volume of unconsolidated material at the first elevation.

10 Claims, 8 Drawing Sheets

TROLLEY DUMPER APPARATUS

BACKGROUND OF THE INVENTION

Semi-trailers may be used to haul waste material, such as food by-products used for animal feed. Examples of food by-products can include unsold bakery products, unutilized dough, improperly proportioned ingredients, "day-old" products, mislabeled products, and any other products that are unsuitable for retail sale and consumption.

Ideally, such waste material is transported in an optimally uniform, dense condition. Readily compactable waste material may be placed in portions at the rear of a semi-trailer, with each portion compacted horizontally against the semi-trailer front end wall until the semi-trailer is filled. However, not all waste material can be readily prepared in this manner.

Elasticity or cohesion of the waste material may impede its longitudinal movement along the semi-trailer. This can leave voids in the material, or portions having a relatively low degree of consolidation, thereby reducing the payload significantly and/or preparing a load having varying density and/or weight. A relatively high weight over the rear semi-trailer wheels may violate local regulations leading to substantial penalties levied for such "back end weight," even if the total load weight is in compliance with posted maximums.

Waste material may also be deposited into an open-top semi-trailer using an operator-controlled loading apparatus, such as a front-end loader. This process can be slow and expensive. Valuable material can also be inadvertently dropped outside the semi-trailer, requiring clean-up and disposal.

Waste material can be introduced into the top of a ramp or inclined channel emptying into a semi-trailer. To propel waste material to a selected zone in the semi-trailer, the ramp will ideally be at a predetermined inclination. Consequently, the elevation of the top of the ramp above the adjoining ground surface may be unacceptable from a safety standpoint. For example, the ramp structure may be subject to overturning wind forces, the potential for which could be minimized by locating the ramp inside a specially constructed building. Inside or outside a building, it will be necessary to lift the waste material by the loading apparatus to the top of the ramp, subjecting the loading apparatus and its operator to a risk of overturning or droppage. Furthermore, as the height of the ramp increases, cleaning and repair of the ramp structure may be more difficult. To reduce these safety issues, the ramp height can be reduced, thereby shortening the ramp length, e.g. extending only to the semi-trailer mid-section.

Waste material traveling down the ramp will be discharged into the trailer in a pile having a forward slope and a rearward slope. Each deposit of waste material will result in a pile of increasing height and decreasing slope. To load the waste material uniformly in the semi-trailer, the semi-trailer can be repositioned beneath the ramp discharge point, thereby enabling additional waste material to be loaded in remaining empty portions of the trailer. Nevertheless, it may not be practicable to position every portion of the semi-trailer beneath the ramp discharge point, thereby leading to uneven distribution of the load. In such cases, it will likely be difficult, and more costly, to move waste material to empty portions of the semi-trailer in order to provide a uniform distribution throughout the trailer.

BRIEF SUMMARY OF THE INVENTION

An apparatus includes an elevated structure extending along and above a receptacle, a trolley for travel along the elevated structure, a trolley bucket supported by the trolley for receiving and discharging unconsolidated material, and a high-lift structure including a rotatable dumper lift for lifting unconsolidated material from a first elevation to a second elevation greater than the first elevation, and discharging unconsolidated material into the trolley bucket. The high-lift structure is operably coupled with the elevated structure. The rotatable dumper lift can receive a first volume of unconsolidated material at the first elevation, lift the first volume from the first elevation to the second elevation, and discharge the first volume into the trolley bucket. The trolley bucket can discharge the first volume of unconsolidated material into the receptacle while the rotatable dumper lift receives a second volume of unconsolidated material at the first elevation.

DESCRIPTION OF AN EMBODIMENT OF THE INVENTION

Figure 1:
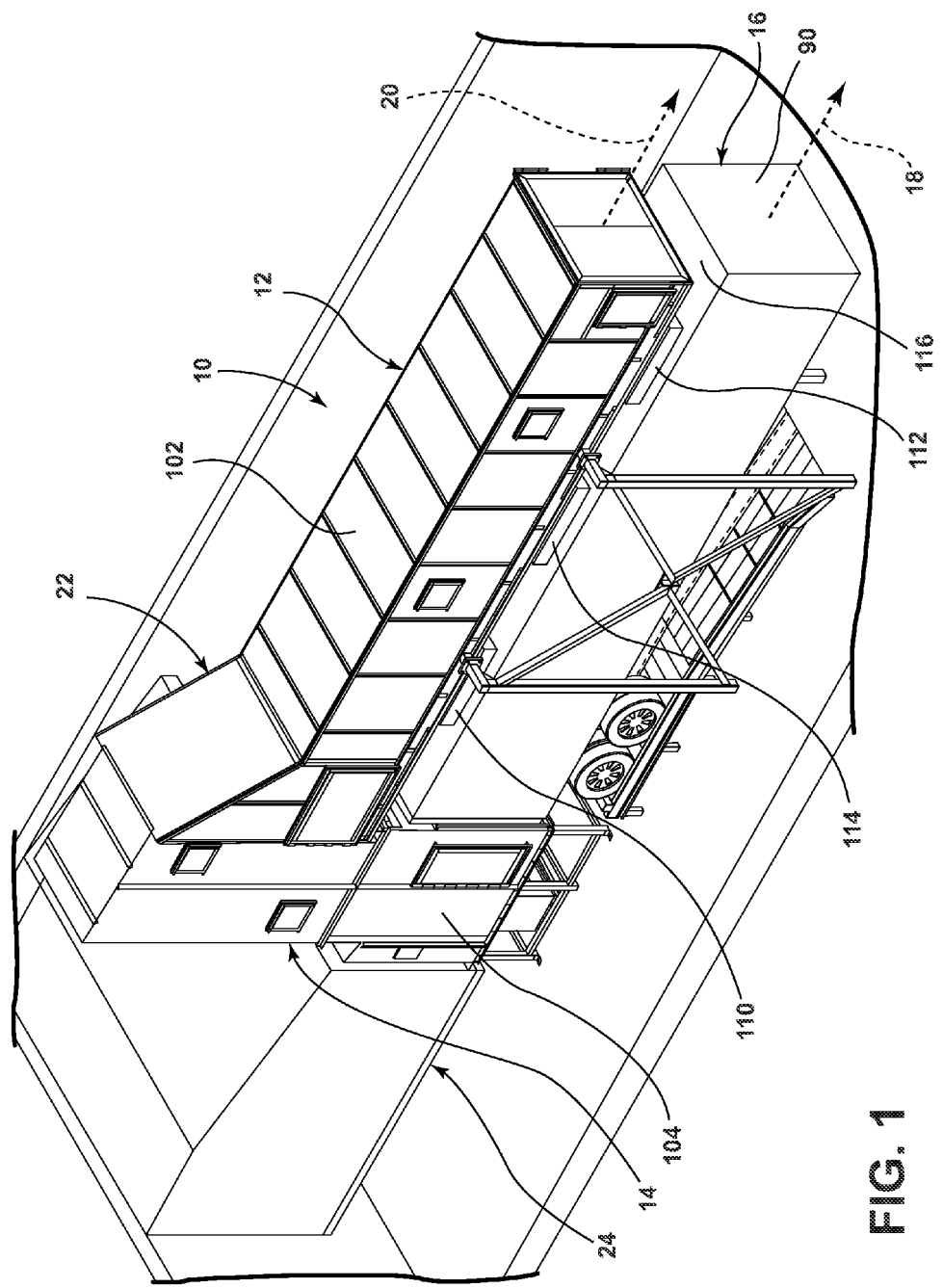
FIG. 1 is a front perspective view of a waste material loading dock and semi-trailer, both operably disposed with a trolley dumper apparatus including an elevated structure and a high-lift structure according to an embodiment of the invention.
Figure 2:
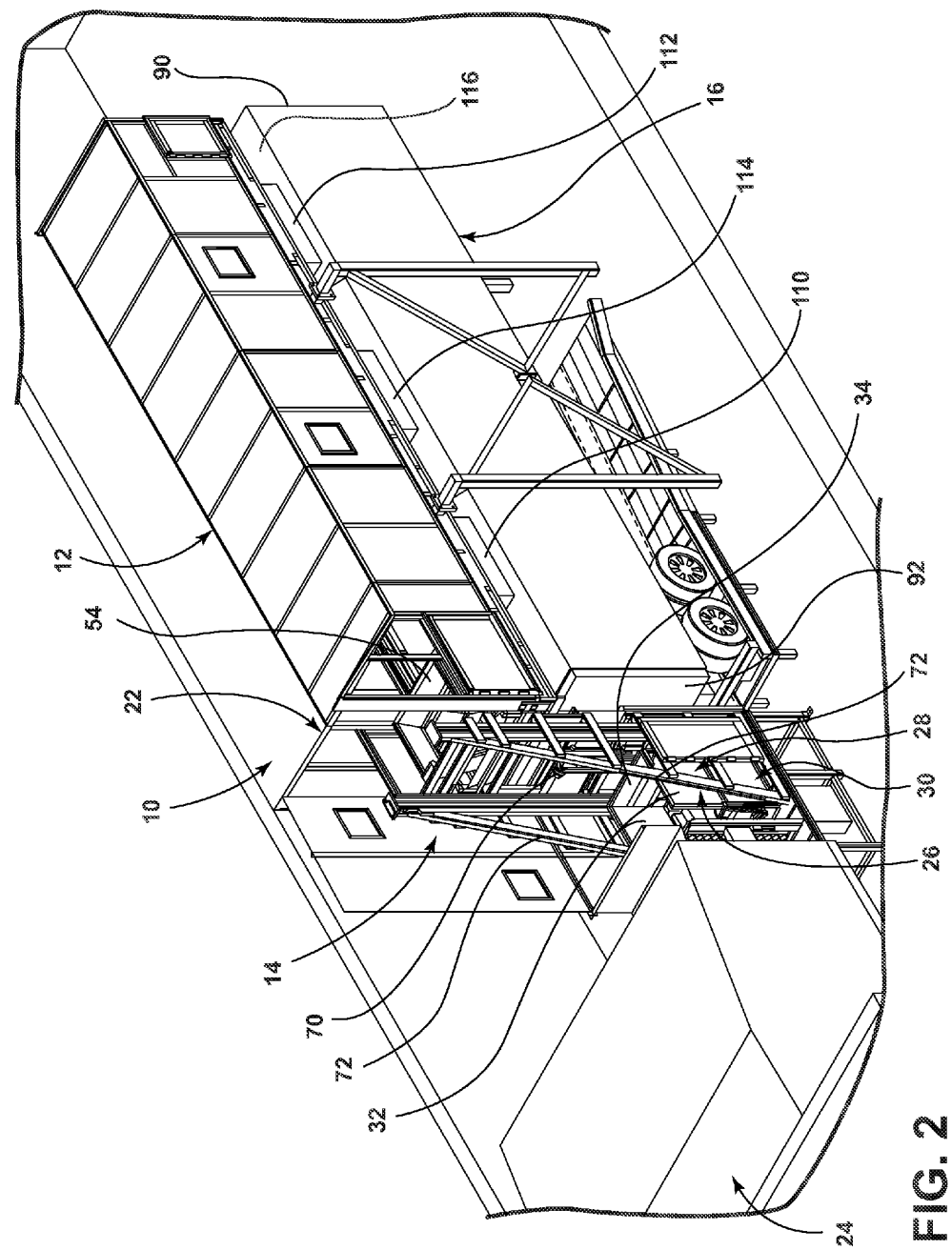
FIG. 2 is a rear perspective view of the trolley dumper apparatus, semi-trailer, and loading dock of FIG. 1, with portions of the elevated structure and high-lift structure omitted for clarity.
Figure 3:
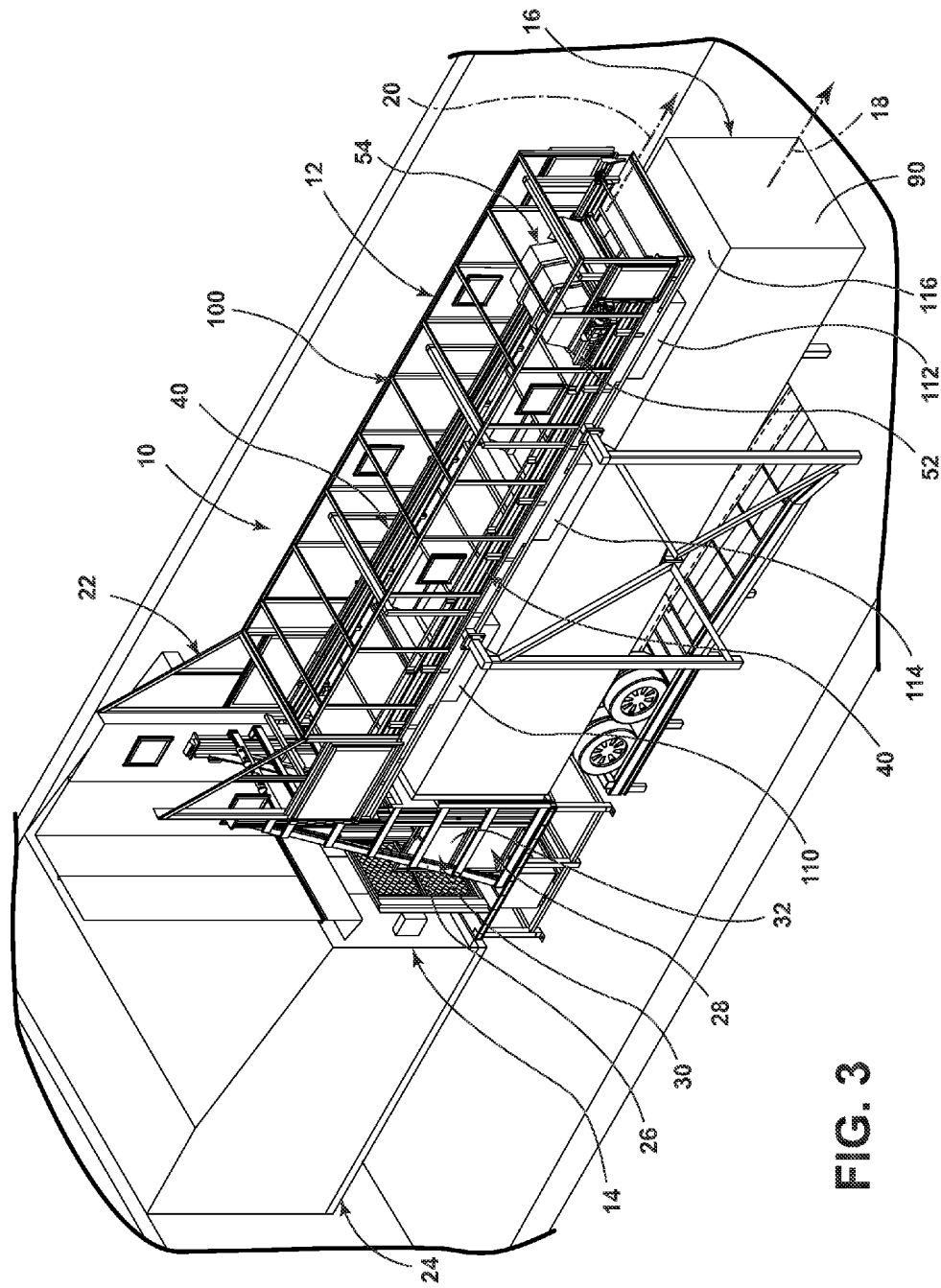
FIG. 3 is a front perspective view of the trolley dumper apparatus, semi-trailer, and loading dock of FIG. 1, with portions of the elevated structure and high-lift structure omitted for clarity.

Referring now to the drawings, and in particular to FIGS. 1-3, an exemplary embodiment of the invention is illustrated comprising a trolley dumper apparatus 10 including an elevated structure 12 and a high-lift structure 14. The high-lift structure 14 may be integrated with a loading dock 24, either during construction of the loading dock 24, or as a retrofit.

The loading dock 24 is exemplary only, and is intended to show an environment in which the invention may be utilized. It forms no part of the claimed invention. It should be noted that the apparatus described and illustrated herein may be erected and operated in the absence of a dock or dock-like structure, including at ground level. Moreover, the description of the invention will be with respect to food waste, although the structure and operation of the trolley dumper apparatus may be customized to accommodate different types of material than that discussed herein.

The high-lift structure 14 may be an enclosed framed structure of extended height (FIG. 3). The elevated structure 12 may be an enclosed horizontally elongate framed structure defining a longitudinal axis 20. The elevated structure 12 and high-lift structure 14 may be functionally coupled at a proximal end of the elevated structure 12 to enable hereinafter-described operations to be conducted. The trolley dumper apparatus 10 may be functionally disposed with the loading dock 24 and with a stationary receptacle 16, illustrated herein as a temporarily parked semi-trailer.

The semi-trailer 16 may define a receptacle longitudinal axis 18, and may terminate at a first end in a receptacle forward end wall 90 and at an opposed second end in a receptacle rearward end wall 92, which may be configured as a hinged semi-trailer gate. The stationary receptacle 16 may include a top wall 116 including a proximal hatch 110, a distal hatch 112, and a medial hatch 114, each hatch providing access to the interior of the receptacle 16 through the top wall 116, as hereinafter described.

The elevated structure 12 may transition to the high-lift structure 14 through a penthouse 22 having an inclined roof extending from the high-lift structure roof to the elevated structure roof.

Referring now to FIG. 2, the high-lift structure 14 is illustrated with portions of a high-lift structure enclosure 104 removed to partially reveal the trolley dumper apparatus 10. The high-lift structure 14 may include a somewhat ladder-like vertical lift frame 70, and a pair of triangular parallel spaced buttress frames 72 coupled with, and extending orthogonally away from, the lift frame 70. The lift frame 70 and buttress frames 72 may be fabricated of vertical, horizontal, and inclined frame elements having suitable properties, such as strength, durability, resilience, and the like, for the purposes intended.

The lift frame 70 and buttress frames 72 may support a movable lift carriage 74 operably coupled with a dumper lift assembly 26 including a lift apparatus 28 and a rotatable dumper lift 30. The lift apparatus 28 may be coupled with the lift frame 70 for selectively raising and lowering the lift carriage 74 and rotatable dumper lift 30. The rotatable dumper lift 30 may be rotatably coupled with the lift carriage 74.

Figures 4A, 4B:
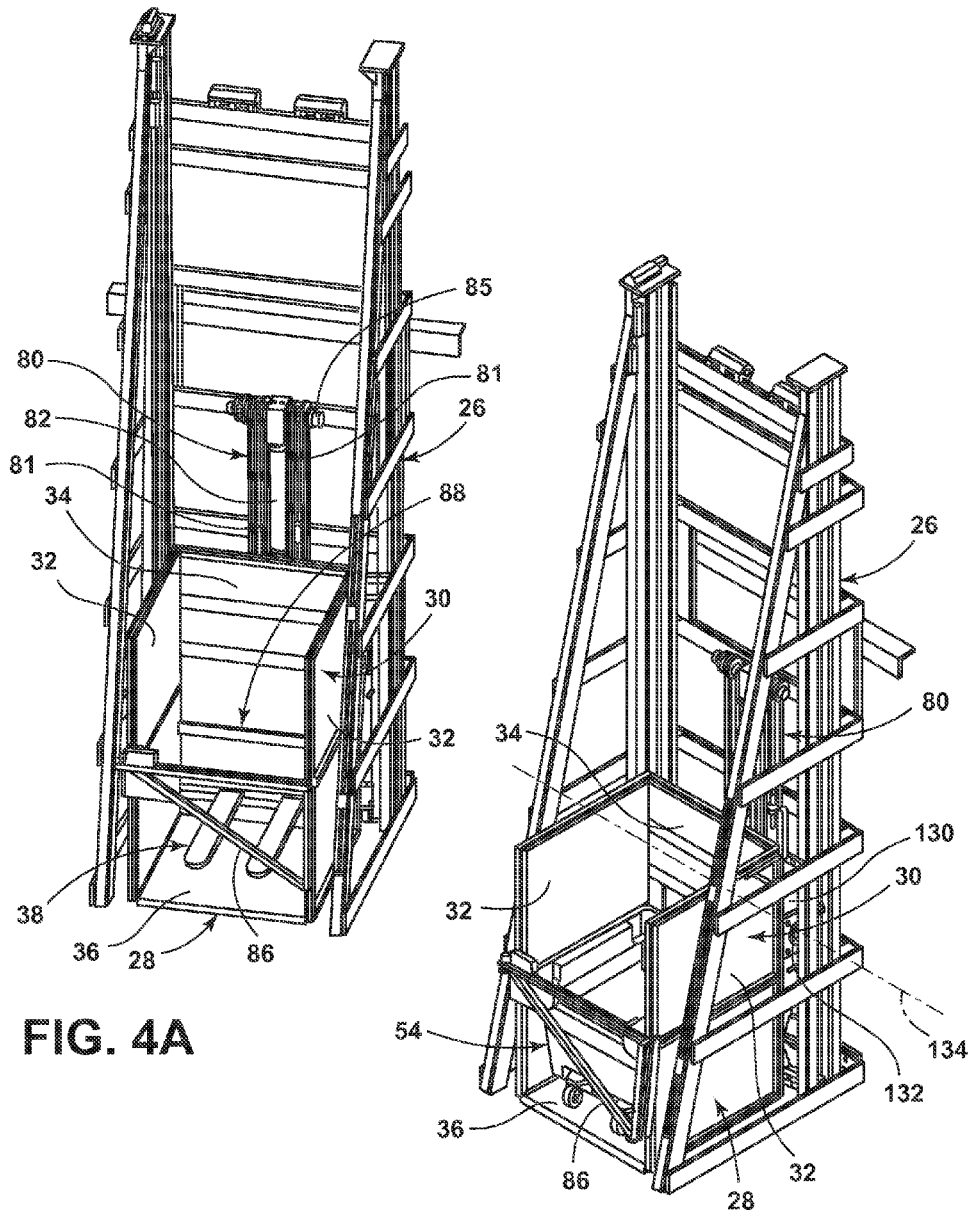
FIGS. 4A and 4B are enlarged perspective views of a dumper assembly illustrated in FIG. 3 comprising a portion of the high-lift structure for lifting waste material from the loading dock to the elevated structure.
Figure 5:
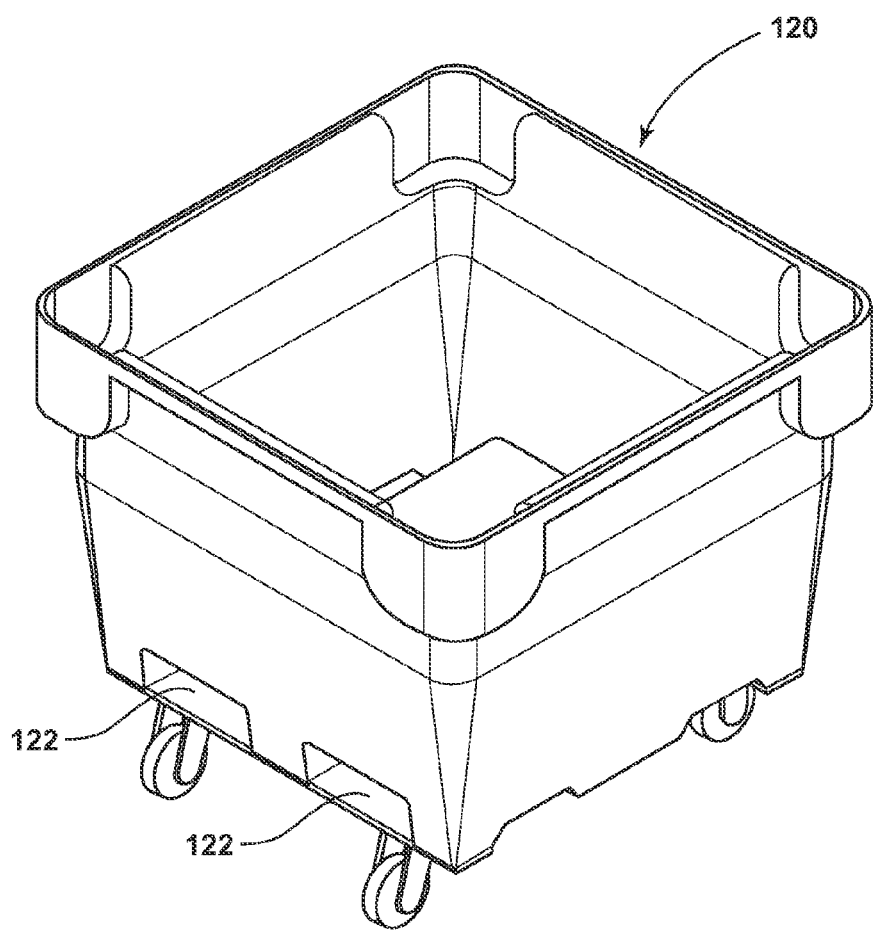
FIG. 5 is a perspective view of an exemplary dumper for holding waste material to be lifted by the dumper assembly.

Referring also to FIGS. 4A/B and 6, the rotatable dumper lift 30 may include a compact 4-sided enclosure having dimensions compatible with the dimensions of waste receptacles to be used with the dumper lift assembly 26, such as the wheeled waste receptacle 120 illustrated in FIG. 5. The waste receptacle 120 may be fabricated of a suitable material such as high-impact plastic, aluminum, steel, and the like. Waste material for feed may be held in stainless steel waste receptacles 120.

The rotatable dumper lift 30 may include a pair of opposed, panel-like, parallel sidewalls 32, a panel-like lift wall 34 extending orthogonally between said sidewalls 32, and a panel-like bottom wall 36 orthogonally coupled with the sidewalls 32 and lift wall 34. This may define an open front/open top rotatable dumper lift 30. The rotatable dumper lift 30 may include a roller assembly (not shown) for crushing selected waste material, such as chips, stale foodstuffs, and the like, to process the material into a more readily loadable form.

Figure 6:
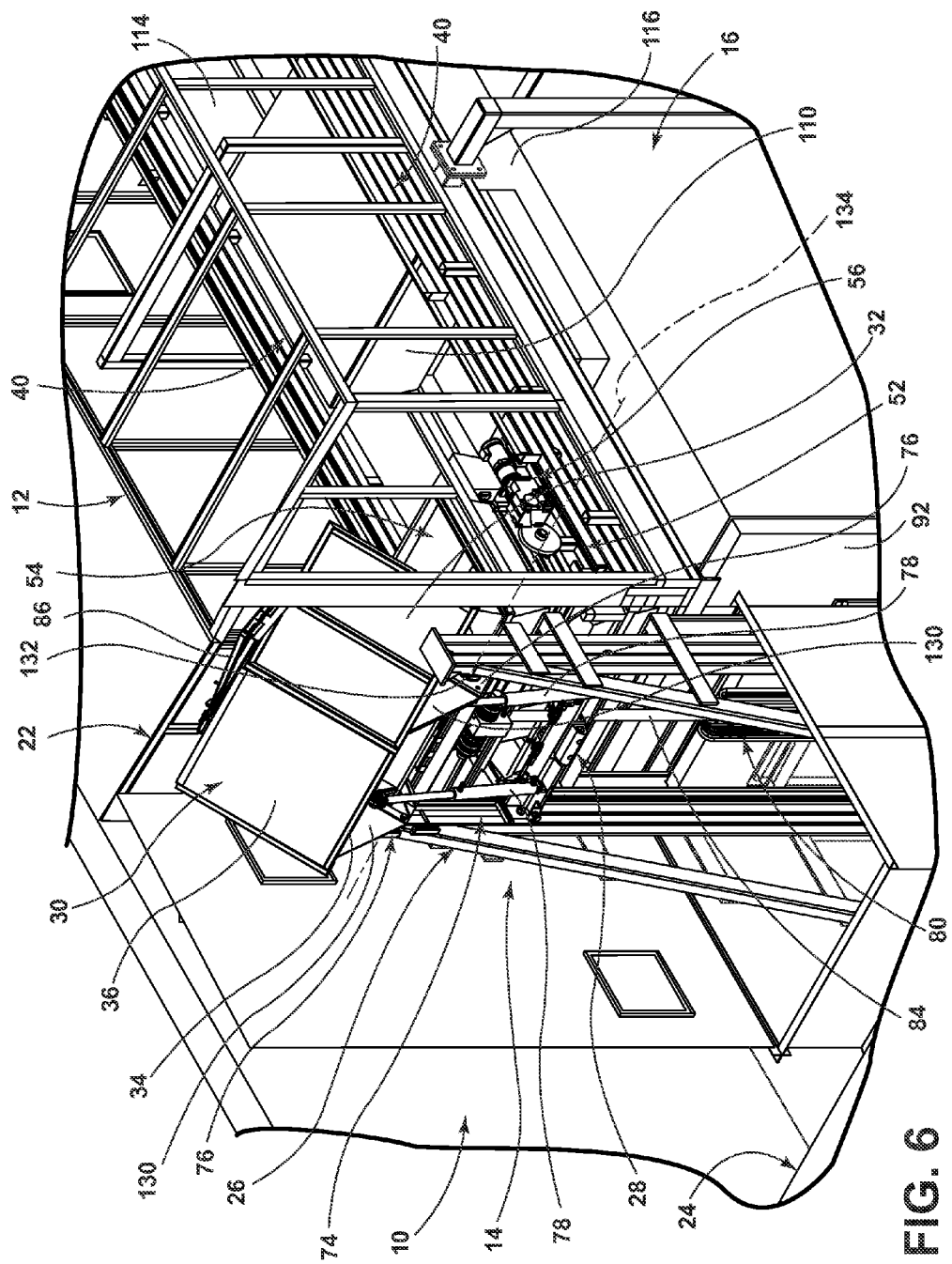
FIG. 6 is an enlarged perspective view of the elevated structure and the high-lift structure, with portions omitted for clarity, illustrating a rotatable dumper lift discharging waste material into a trolley bucket after having been raised to the top of the high-lift structure.
Figure 7:
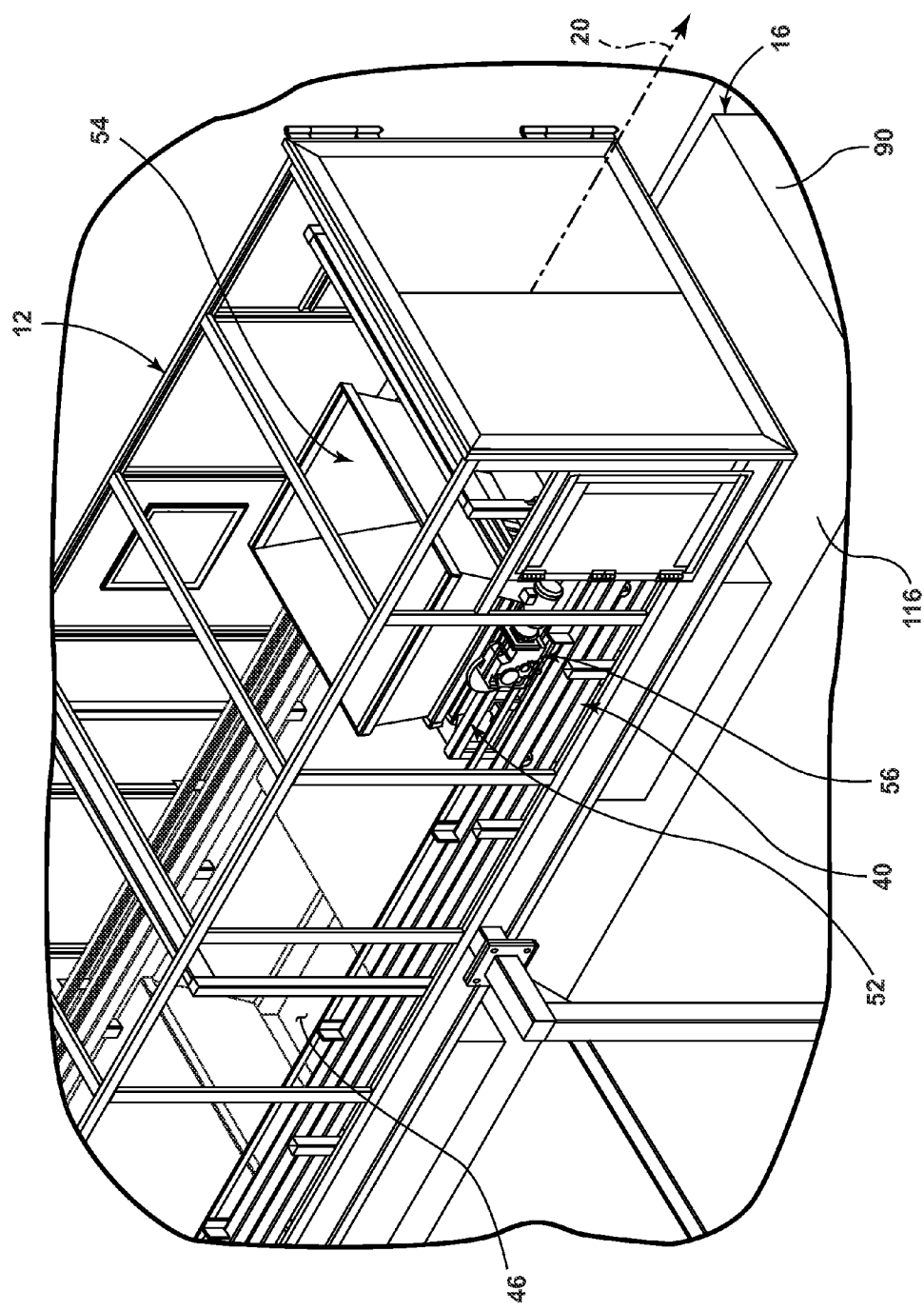
FIG. 7 is a perspective view of a portion of a distal end of the elevated structure illustrating a trolley and trolley bucket over a hatch for discharging waste material into the semi-trailer at a first location.

As illustrated in FIG. 6, a pair of coaxially-aligned pivot assemblies 76 may be rigidly coupled with the lift wall 34 adjacent the lift frame 70, or with the sidewalls 32. Each pivot assembly 76 may comprise a polygonal planar rotatable plate 130 extending orthogonally away from the lift wall 34, and incorporating a pivot connection 132 defining a pivot axis 134 laterally parallel to and spaced somewhat away from the lift wall 34. Each pivot assembly 76 may be rotatably coupled with the lift carriage 74 to enable the rotatable dumper lift 30 to pivot from an upright configuration (FIGS. 2 and 4A/B) to a discharge configuration (FIG. 6).

The rotatable dumper lift 30 may be rotated about the pivot axis 134 by the action of a pair of hydraulic tilt cylinders 78. Each cylinder 78 may be rotatably coupled with the lift carriage 74 and the rotatable dumper lift 30. Extension of the hydraulic tilt cylinders 78 may rotate the dumper lift 30 to the position illustrated in FIG. 6 for discharge of waste material from the waste receptacle 120. Retraction of the hydraulic tilt cylinders 78 may rotate the dumper lift 30 to the position illustrated in FIGS. 2 and 4A/B for receipt of a waste receptacle 120 holding waste material.

Referring specifically to FIG. 4A, the rotatable dumper lift 30 may include a dumper fork assembly 38 extending orthogonally away from the lift wall 34 a short distance above and parallel to the bottom wall 36. The dumper fork assembly 38 may engage a pair of dumper fork slots 122 in the waste receptacle 120, as illustrated in FIGS. 4B and 5, to position and secure the waste receptacle 120 in the rotatable dumper lift 30. It should be noted that alternative means of positioning and securing a waste receptacle in the rotatable dumper lift may be utilized based upon factors such as the weight of the waste receptacle and its contents, relevant properties of the waste material, the shape and dimensions of the waste receptacle, and the like. The rotatable dumper lift 30 may include a hinged retaining gate 86, which may be closed to minimize the potential for unintended movement of the waste receptacle 120 out of the dumper lift 30.

A crumb angle 88 may comprise an elongate member, having an L-shaped cross-section, extending across the lift wall 34 at about the height of the waste receptacle 120. The crumb angle 88 may be generally parallel with the bottom wall 36, and adapted so that one leg may be attached to the lift wall 34, with the other leg extending in a cantilevered fashion orthogonally away from the lift wall 34. When the waste receptacle 120 is placed in the rotatable dumper lift 30, the crumb angle 88 cantilevered leg may extend over the edge of an adjacent waste receptacle wall, thereby inhibiting the migration of waste material between the waste receptacle 120 and the lift wall 34.

The lift carriage 74 may be movably coupled with the buttress frames 72 through bearings, wheels, and the like, to enable the lift carriage 74 to vertically travel smoothly and stably along the buttress frames 72 adjacent the lift frame 70.

A lift assembly 80 may lift the rotatable dumper lift 30 above the top of the lift apparatus 28, and may include a lift cylinder 82 with a lift piston 84 (FIG. 6), a pair of multiple loop lifting chains 81, and a chain sprocket assembly 85 having a pair of coaxial chain sprockets straddling an end of the lift piston 84. The lift cylinder 82 may be coupled with the lift frame 70. The lift piston 84 may be movably coupled at one end with the chain sprocket assembly 85 and slidably coupled at an opposed end with the lift cylinder 82. One end of each multiple loop lifting chain 81 may be coupled with the rotatable dumper lift 30, and the other end of each multiple loop lifting chain 81 may be coupled with the lift frame 70 so that extension of the lift piston 84 may raise the lift carriage 74 and rotatable dumper lift 30 upwardly along the lift frame 70.

The lift cylinder 82 may be fluidly coupled with a lift actuator (not shown) providing hydraulic power for raising and lowering the dumper lift 30. In an application in which feed waste material is handled, an oil-based hydraulic system may be undesirable due to a risk of contamination from an oil leak. Thus, an alternative system, such as an electric motor system, may be utilized.

Referring to FIGS. 2, 3, and 6-8, a trolley support assembly 40, in pertinent part, may include a pair of rails 42 extending the length of the elevated structure 12 and parallel to the structure longitudinal axis 20. The rails 42 may define a railway 44 for movably supporting a trolley 52, which in turn may support a rotatable trolley bucket 54. One or more drive chains 48 may selectively pull the trolley 52 along the railway 44.

Figure 8:
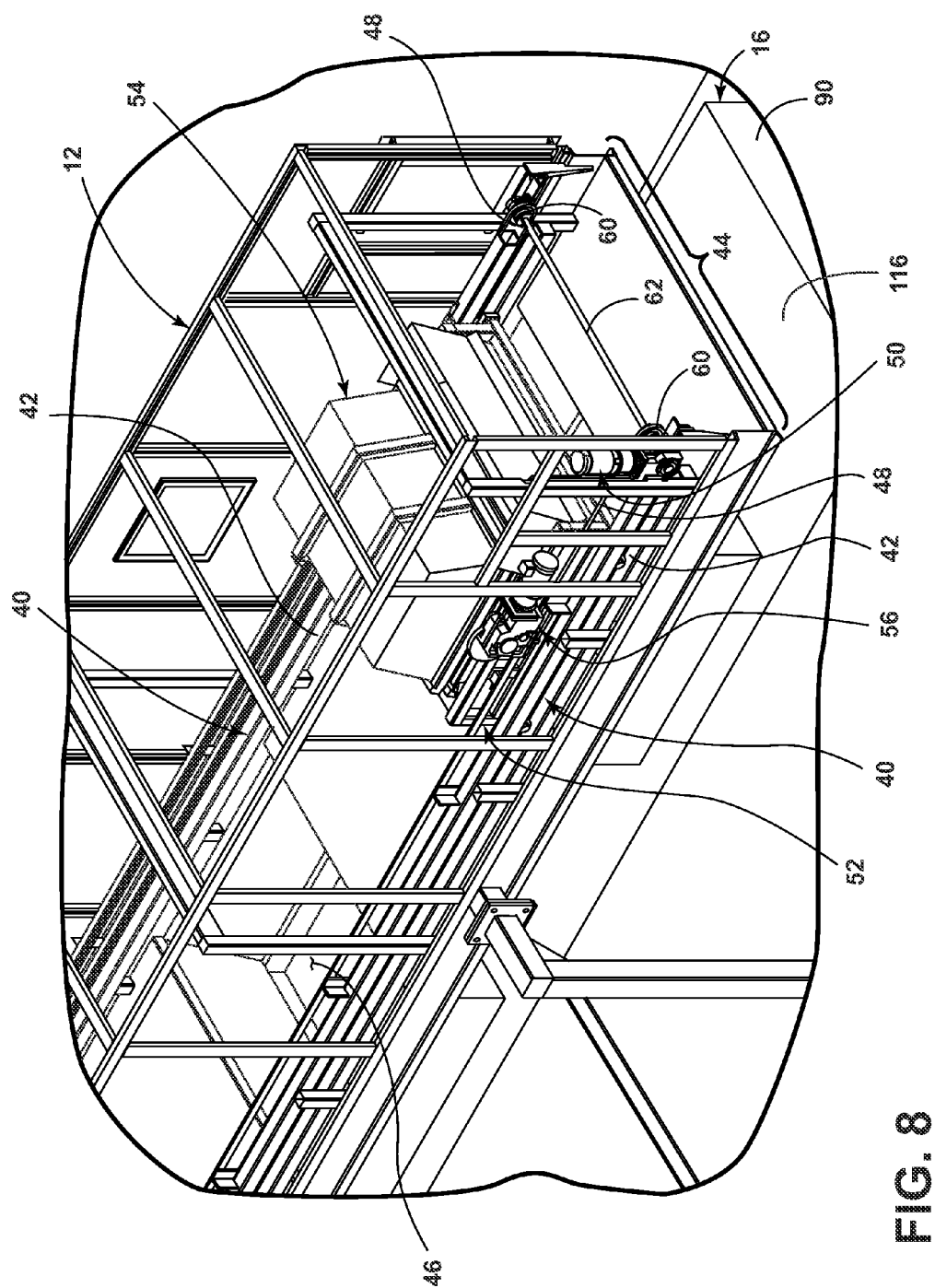
FIG. 8 is a perspective view similar to FIG. 7, with the trolley bucket rotated to a discharge position to enable waste material to be discharged into the semi-trailer.

As illustrated in FIG. 8, the drive chains 48 may be coupled with a pair of sprockets 60 rotatably mounted at a distal end of the elevated structure 12 by an axle 62. A drive chain actuator 50 comprising an electric motor may be fixedly coupled at a distal end of the railway 44 for rotating the axle 62 and sprockets 60. The rotation of the sprockets 60 may move the drive chains 48.

The drive chains 48 may be fixedly attached to the trolley 52 so that rotation of the axle 62 and sprockets 60 may move the trolley 52 along the rails 42. The drive chains 48 may be similarly coupled with a rotatable pair of sprockets (not shown) at a proximal end of the elevated structure 12 to enable a continuous chain drive having both ends of the drive chains 48 attached to the trolley 52 and engaging each sprocket 60. Thus, rotation of the drive chain actuator 50 in one direction may move the trolley 52 from the proximal end to the distal end of the elevated structure 12. Similarly, rotation of the drive chain actuator 50 in an opposite direction may move the trolley 52 from the distal end to the proximal end of the elevated structure 12. The trolley 52 may be stopped at any intermediate location by controlling the movement of the drive chain actuator 50. A controller (not shown) may be incorporated into the trolley dumper apparatus 10 for controlling the operation of the trolley 52 and dumper lift assembly 26.

The trolley bucket 54 may be pivotably coupled with the trolley 52 to enable the trolley bucket 54 to rotate entirely within the perimeter of a hatch 110, 112, 114 when the trolley 52 is positioned vertically over the hatch 110, 112, 114. A bucket rotation actuator 56 comprising an electric motor may be fixedly coupled to the trolley 52 and rotatably coupled with the trolley bucket 54 for rotating the trolley bucket 54 between an upright orientation (FIG. 7) and an overturned orientation (FIG. 8).

The trolley 52 may be stopped at the proximal end of the elevated structure 12 to enable one or more loads of waste material to be discharged into the trolley bucket 54 from the rotatable dumper lift 30, as illustrated in FIG. 6, based upon the volume of the waste receptacle 120 relative to the volume of the trolley bucket 54. When the trolley bucket 54 is full, the trolley 52 may be moved along the railway 44 to a selected location along the elevated structure 12 for discharge of the contents through a hatch 110, 112, 114 into the semi-trailer 16. Selective deposition of waste material into the hatches 110, 112, 114 may result in an evenly distributed load in the semi-trailer 16.

The trolley dumper apparatus 10 described and illustrated herein may enable waste material accumulated at a production facility to be rapidly deposited into an elevated receptacle 16. The waste material may be evenly distributed along a longitudinal axis 18 of the receptacle 16, thereby ensuring that the total receptacle/payload weight is distributed in accordance with applicable transportation regulations. Even distribution in the receptacle may optimize the density of the payload, ensuring that an optimal payload may be hauled.

The trolley dumper apparatus 10 may enable waste material to be deposited in the receptacle 16 from the forward end wall 90 to the rearward end wall 92 without utilizing a waste loading system of a significant height. The only height extension is from the penthouse 22, which is necessary to accommodate the rotatable dumper lift 30 when it discharges its contents into the trolley bucket 54. The height required for the trolley bucket 54 to clear the roof of the elevated structure 12 is substantially lower than that of comparable prior art loading systems. The trolley dumper apparatus 10 may contribute to improved efficiencies in the management of waste material due to improved loading operations, less spillage, optimization of payloads, and loading and transportation safety.

The invention has been described and illustrated in the context of the dumper lift assembly 26. However, this should not be considered as a limitation on the scope of the claims. Other means of delivering waste material to the trolley bucket 54 may be contemplated, such as horizontal or inclined belt conveyors, bucket conveyors, augers, and the like.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An apparatus for depositing unconsolidated material into a receptacle, the apparatus comprising:
    an elevated structure having a structure longitudinal axis, a proximal end and a distal end, and extending along the structure longitudinal axis from the proximal end to the distal end;
    a trolley for travel along the elevated structure between the proximal end and the distal end;
    a trolley bucket supported by the trolley for receiving a volume of unconsolidated material at the proximal end and discharging a volume of unconsolidated material into the receptacle; and
    a high-lift structure, including a rotatable dumper lift movable between a first elevation and a second elevation greater than the first elevation, for lifting unconsolidated material from the first elevation to the second elevation, and discharging unconsolidated material into the trolley bucket at the proximal end;
    wherein the rotatable dumper lift is configured to receive a first volume of unconsolidated material at the first elevation, lift the first volume of unconsolidated material from the first elevation to the second elevation, discharge the first volume of unconsolidated material into the trolley bucket at the second elevation, and return empty to the first elevation; and
    wherein the trolley bucket is configured to discharge the first volume of unconsolidated material between the proximal and the distal ends into the receptacle positioned beneath the elevated structure while the rotatable dumper lift receives a second volume of unconsolidated material at the first elevation.

2. An apparatus for depositing unconsolidated material according to claim 1 wherein the trolley bucket is rotatable on the trolley about a trolley rotational axis and the rotatable dumper lift is rotatable about a pivot axis parallel to the trolley rotational axis.

3. An apparatus for depositing unconsolidated material according to claim 2 wherein the elevation of the trolley rotational axis is unchanging.

4. An apparatus for depositing unconsolidated material according to claim 3 wherein an elevation of the pivot axis is alternately above and below an elevation of the trolley rotational axis.

5. An apparatus for depositing unconsolidated material according to claim 1 wherein the high-lift structure is operably coupled with the elevated structure.

6. An apparatus for depositing unconsolidated material into a receptacle having a receptacle longitudinal axis, the apparatus comprising:
   an elevated structure characterized by a structure longitudinal axis, a proximal end, and a distal end, and supporting a railway extending from the proximal end to the distal end parallel to the structure longitudinal axis;
   a trolley having wheels for travel along the railway;
   a trolley bucket, characterized by a trolley rotational axis, supported by the trolley, and rotatable about the trolley rotational axis relative to the trolley between a first orientation for receiving unconsolidated material, and a second orientation for discharging unconsolidated material into the receptacle positioned beneath the elevated structure with the receptacle longitudinal axis parallel to the structure longitudinal axis; and
   a lift apparatus, including a rotatable dumper lift characterized by a pivot axis for lifting unconsolidated material to the trolley, and discharging unconsolidated material into the trolley bucket;
   wherein unconsolidated material is dischargeable from the trolley bucket into the receptacle at selectable locations along the receptacle longitudinal axis without changing the elevation of the lift apparatus.

7. An apparatus for depositing unconsolidated material into a receptacle having a receptacle longitudinal axis, the apparatus comprising:
   an elevated structure characterized by a structure proximal end, an opposed structure distal end, and a structure longitudinal axis extending through the structure proximal end and the opposed structure distal end;
   at least one rail supported by the elevated structure, and parallel to the structure longitudinal axis, the at least one rail characterized by a rail proximal end and an opposed rail distal end;
   a trolley movable on the at least one rail between the rail proximal end and the opposed rail distal end; and
   a trolley bucket supported by the trolley and movable from a depositable orientation to a dischargeable orientation relative to the trolley;
   wherein a volume of unconsolidated material in the trolley bucket is selectively dischargeable from the trolley bucket into the receptacle positioned beneath the elevated structure with receptacle longitudinal axis parallel to the structure longitudinal axis as the trolley moves on the at least one rail so that a generally uniform distribution of unconsolidated material in the receptacle is achieved.

8. An apparatus for depositing unconsolidated material according to claim 7 wherein the trolley bucket is rotatable on the trolley about a trolley rotational axis.

9. An apparatus for depositing unconsolidated material according to claim 8 wherein the trolley rotational axis is perpendicular to the structure longitudinal axis.

10. An apparatus for depositing unconsolidated material according to claim 7 further comprising a lift apparatus to lift volume of unconsolidated material to a position where it is depositable from above into the trolley bucket.

\* \* \* \* \*